(12) United States Patent
Vaisanen et al.

(10) Patent No.: US 9,783,870 B2
(45) Date of Patent: Oct. 10, 2017

(54) METHOD FOR PROCESSING ASH, PARTICULARLY FLY ASH

(71) Applicant: JYVASKYLAN ENERGIA OY, Jyvaskyla (FI)

(72) Inventors: Ari Vaisanen, Korpilahti (FI); Jussi Valkonen, Helsinki (FI); Siiri Peramaki, Muurame (FI); Ville Soikkeli, Kuopio (FI); Risto Ryymin, Laukaa (FI)

(73) Assignee: JYVASKYLAN ENERGIA OY, Jyvaskyla (FI)

( * ) Notice: Subject to any disclaimer, the term of this patent is extended or adjusted under 35 U.S.C. 154(b) by 99 days.

(21) Appl. No.: 14/360,088

(22) PCT Filed: Nov. 30, 2012

(86) PCT No.: PCT/FI2012/051196
§ 371 (c)(1),
(2) Date: May 22, 2014

(87) PCT Pub. No.: WO2013/079804
PCT Pub. Date: Jun. 6, 2013

(65) Prior Publication Data
US 2015/0211094 A1 Jul. 30, 2015

(30) Foreign Application Priority Data

Dec. 2, 2011 (FI) ..................... 20116228

(51) Int. Cl.
| | |
|---|---|
| *C22B 59/00* | (2006.01) |
| *C01G 55/00* | (2006.01) |
| *C01G 5/00* | (2006.01) |
| *C01G 7/00* | (2006.01) |
| *C22B 7/02* | (2006.01) |
| *C22B 3/00* | (2006.01) |
| *C01F 17/00* | (2006.01) |
| *C22B 3/06* | (2006.01) |
| *C22B 3/08* | (2006.01) |
| *C22B 3/16* | (2006.01) |
| *C22B 3/44* | (2006.01) |

(52) U.S. Cl.
CPC .......... *C22B 59/00* (2013.01); *C01F 17/0006* (2013.01); *C01G 5/00* (2013.01); *C01G 7/00* (2013.01); *C01G 55/00* (2013.01); *C22B 3/065* (2013.01); *C22B 3/08* (2013.01); *C22B 3/165* (2013.01); *C22B 3/44* (2013.01); *C22B 7/02* (2013.01); *C22B 11/044* (2013.01); *Y02P 10/214* (2015.11)

(58) Field of Classification Search
CPC .. C01G 55/00; C01G 5/00; C01G 7/00; C01F 17/00; C22B 7/006; C22B 7/007; C22B 7/02; C22B 11/044; C22B 3/44; C22B 3/065; C22B 3/08; C22B 3/165; C22B 59/00
USPC ...................... 423/21.1, 22, 27, 34
See application file for complete search history.

(56) References Cited

U.S. PATENT DOCUMENTS

| | | | | |
|---|---|---|---|---|
| 1,815,888 | A * | 7/1931 | Baily | C21B 13/00 106/DIG. 1 |
| 4,649,031 | A * | 3/1987 | Matyas | B03B 9/04 423/131 |
| 5,917,117 | A * | 6/1999 | Ensley | B09C 1/105 210/602 |
| 2012/0000832 | A1* | 1/2012 | Murray | B03B 9/00 209/3.1 |
| 2013/0181075 | A1* | 7/2013 | Pickens | B03B 9/04 241/14 |
| 2014/0090518 | A1* | 4/2014 | Stumpf | C22B 5/10 75/631 |

FOREIGN PATENT DOCUMENTS

| | | |
|---|---|---|
| CN | 101200305 | 6/2008 |
| FI | 935316 | 5/1995 |
| GB | 1489557 | * 10/1977 |
| JP | 2007-321239 | 12/2007 |
| JP | 2012-031499 | * 2/2012 |

OTHER PUBLICATIONS

Cherepanov, "Noble metals in ash-cinder wastes of the far east thermal power plants" Russian J. of Pacific Geology, 2008, 2(2), pp. 110-121.*
RU 2315817, Jan. 27, 2008, Abstract only.*

* cited by examiner

*Primary Examiner* — Steven Bos
(74) *Attorney, Agent, or Firm* — Fildes & Outland, P.C.

(57) ABSTRACT

Disclosed is a method for processing ash, particularly fly ash, in which method several elements are separated from the ash. In the method both noble metals and rare earth elements are separated.

14 Claims, 2 Drawing Sheets

METHOD FOR PROCESSING ASH, PARTICULARLY FLY ASH

TECHNICAL FIELD

The present invention relates to a method for processing ash, particularly fly ash, in which several elements are separated from the ash.

BACKGROUND OF THE INVENTION

The European Union (EU) is increasingly dependent on the import of not only primary energy sources, but also of industrial raw materials. The EU is therefore more exposed and vulnerable than other states to the effects of market distortion. Some of these industrial primary raw materials are used in the manufacture of so-called high technology products. The products in question are utilized in, among others, environmental technology solutions, to promote the improvement of energy efficiency and the reduction of greenhouse gas emissions.

In 2010, the European Commission analyzed the economic importance and availability risk of a total of 41 raw materials used by industry. Fourteen of the minerals and metals analyzed were deemed critical to the industrial activity of the European Union, because they have a significant economic effect on key sectors, or their availability and replacement contain significant risks. The raw materials classified as critical are antimony, indium, beryllium, magnesium, cobalt, niobium, calcium fluoride, the metals of the platinum group, gallium, the rare earth elements (lanthanums), germanium, tantalum, graphite, and wolfram.

Every year, about one million tonnes of waste are created in Finnish power plants. The waste is mostly ash arising from combustion and sulphur removal. The ash is either so-called bottom ash or fine particle fly ash collected from flue gas filters. The ash typically contains mainly incombustible minerals, silicates, and possibly also heavy metals. Most of this ash, about 60%, is used as various earthworks, for example, in field structures and as a filler in landfill structures, as well as a batching material in concrete and cement, for example, as a raw material in cement and in building boards. These exploitable ashes are typically utilized for such purposes in the state in which they leave the power plant. Most of these exploitable ash wastes (about 55%) are generated from coal burning.

The low degree of utilization has partly been due to the relatively cheap final disposal costs and the statutory waste status of ash, as well as the tight content restrictions in, for example, fertilizer and earthwork uses. However, changing tax procedures and steadily rising transport costs have placed a continually increasing cost pressure on power plants in terms of ash treatment.

In waste exploitation, the point of departure is to meet statutory obligations. Attempts have been made to use legislation to facilitate the use in earthworks of bottom and fly ash from the combustion of coal, peat, and wood-based material. However, the quality of the ashes must be defined and monitored. By also limiting the thickness of a final disposal structure, the aim has been to prevent the creation of uncontrolled sorting areas. For example, fly ash can be consolidated if water is added to it and it is compacted. Fly ash can then be used, for example, as structural layer in a road.

Most of the ash from mixed combustion is formed in fluid bed combustion power plants. The quality of wood ash also varies between the different parts of a tree. For example, the metals contents relative to energy content are greater in the bark and branches than in the trunk. The element contents of the ground also vary according to time and place, which affects the quality of the ash. When trees and plants grow, they absorb minerals and elements along with water from the ground, which enrich the structures of the trees and plants during growth. Indeed, it can be assumed that plants manifest the geology of the area in which they grow, and that variations in the element contents of the ground can be detected from the composition of the ash.

Quite a large number of solubility studies exist for the fly ash of coal. The emphasis of these studies is generally the solubility of specific harmful substances. The solubility of other metals from the fly ash of coal has been shown to be quite small. The solubility properties of the ash from mixed combustion generally correspond to the solubility of ash formed from the combustion of coal and peat.

The amount of biofuels used in energy production is increasing due to the aims and objectives of climate and energy policies. The most important reasons for the increase in the use of biofuels are the EU's statutory greenhouse gas reduction goals through the year 2020 and the aim of increasing renewable energy. The reduction goal for greenhouse gases is 20% of the year 1990 level, and the goal for increasing renewable energy is 20% of total energy consumption compared to the year 2005 level. The increasing use of biofuels in power plants changes not only the combustion event but also the composition of the ash that is created.

There are several methods, most of which have been developed to make the processing of ashes suitable for disposal in a landfill. Dry ash can be air classified, in which the ash is divided into various fractions on the basis of particle size and specific weight. Most soluble substances and heavy metals exist in small particles, which can be separated by air classification. Correspondingly, soluble substances can be separated using water or acid washing. However, washing increases processing costs and creates waste water. The solubility properties of ash can also be affected by storage. When ash ages, it reacts with air, changing its solubility. Heavy metals can be removed by thermal methods. However, heating processes consume a lot of energy and do not completely purify the ash.

Finnish patent number 101572 discloses a method of stabilizing fine ash into larger ash particles. However, the disclosed method requires a combustion plant of a specific type. In addition, the method is unsuitable for processing fly ash, which is removed only in the final stage of the combustion process. The use of fly ash for earthworks is problematic due to its capillary structure. In practice, a layer formed of fly ash is susceptible to frost heave even when compacted.

Japanese patent application number 2007321239 discloses the recovery of copper from fly ash. In the disclosed method, the fly ash is treated with additives and the mixture is processed at a high temperature. The method is suitable for only a limited number of elements and requires a great deal of energy, while providing only a modest yield.

SUMMARY OF THE INVENTION

The presently claimed invention is a method for processing ash, particularly fly ash, which is more efficient than previous processing methods. The presently claimed invention also provides for the isolation of a greater number of more valuable elements from the ash than previous processing methods, resulting in a substantial reduction in the costs arising from the ash. For example, the elements separated from the ash can be re-utilized as raw materials in industrial processes. The characteristics features of the present invention include separating several elements from the ash, the several elements including both noble metals and rare earth elements, the noble metals and the rare earth elements being separated from the ash in two extraction processes, the noble metals being separated in the first extraction process and the rare earth elements being separated in the second extraction process. In the method according to the invention, ash is processed in stages, so that the numerous elements are recovered in a controlled manner. In addition, the substances used in the stages of the process are cheap and sage, and can be recycled or otherwise exploited after the process is complete. The stages of the isolating process can be linked in a chain, thus making the total process efficient, which increases the yield of elements. At the same time, the purity of the elements is good and the residue of the isolating stages of the process can be utilized as a raw material instead of being waste as in previous methods. In this way, the processing of ash, which previously increased costs, instead becomes a profitable business activity.

These and other features and advantages of the invention will be more fully understood from the following detailed description of the invention taken together with the accompanying drawings.

DETAILED DESCRIPTION OF THE INVENTION

Figure 1:
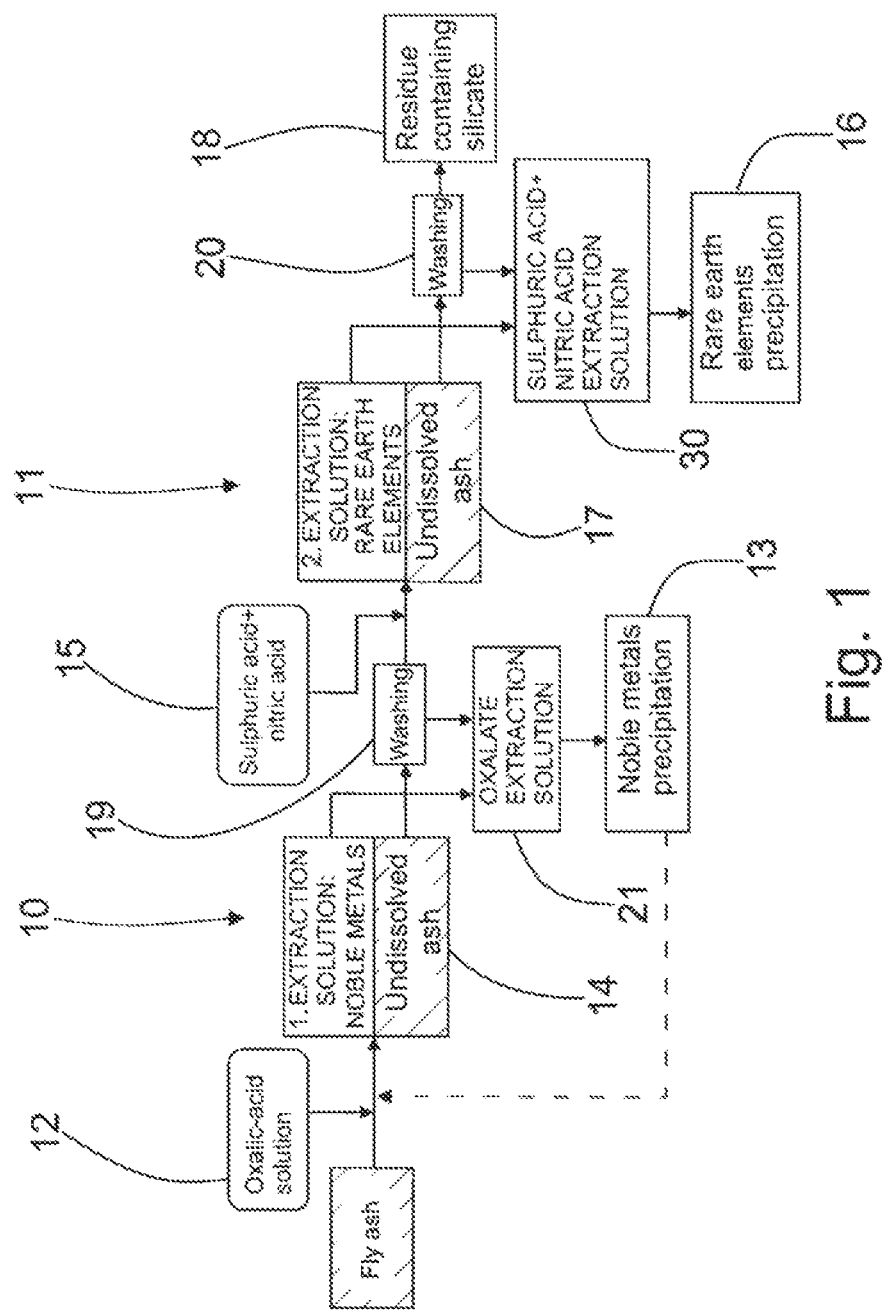
FIG. 1 is a schematic view of a method for processing ash according to the invention.

FIG. 1 is a stage-by-stage illustration of the method according to the invention for the processing of ash, particularly fly ash. In the method, several elements are separated from the ash. More specifically, both noble metals and rare earth elements are separated from the ash. Surprisingly, there are significant amounts of noble metals and rare earth elements in ash and particularly in fly ash. Thus, the present method makes the processing of fly ash profitable and, at the same time, the processed ash can be utilized more widely than before. In other words, instead of obtaining harmful elements as in previous methods, the method according to the invention results in the separation of economically significant elements from the ash.

Ash is known to be poorly soluble. Therefore, the invention includes staged processing, which is preferably continuous. Part of the processing may also operate on the batching principle, allowing the process to proceed in specific cycles while being nevertheless continuous. In the invention, the elements are isolated in a two-stage extraction process 10 and 11. In other words, there are two extraction processes one after the other. Thus, the isolation of the elements is standardized and the desired elements obtained from the extraction processes are isolated. In the first extraction process 10 noble metals are isolated, and in the second extraction process 11 rare earth elements are isolated. Both of the extraction processes may be optimized separately, thus increasing the yield of the obtained elements.

Generally, in the extraction solids are dissolved in a liquid such as water. It is desirable for the substances contained in the solid to dissolve as completely as possible. However, it has proven to be challenging to dissolve ash, so that in the first extraction process 10 according to the invention the noble metals are dissolved using specifically a solution of oxalate in water 12, in which case the elements dissolve selectively. It was observed during the development of the method that an acid solution with an oxalate content effectively dissolves noble metals without, however, dissolving rare earth elements. The water solution with an oxalate content is formed using either oxalic acid ($H_2C_2O_4$) or ammonium oxalate (($NH_4)_2C_2O_4$). In addition, the extraction solution should be acidic. The greatest efficiency is obtained when the pH of the extraction solution is adjusted to a value 2 or less. The extraction typically lasts for a period of hours to tens of hours, depending on the properties and concentration of the solution. The oxalate extraction solution 21 obtained from the first extraction process 10 is led to a first step 13, which will be depicted in detail later, in order to isolate the noble metals.

During the development of the method, it was observed that undissolved ash 14 remained in the first extraction process 10. Because the oxalate-containing water solution 12 did not dissolve all the solids, another substance promoting dissolving was selected. In the second extraction process 11 according to the invention, rare earth elements that did not dissolve in the first extraction process 10 are dissolved from the ash by using a solution 15 that is a mixture of sulphuric acid and nitric acid. Sulphuric acid was chosen as the extraction solution for this stage because it does not cause much corrosion and is thus suitable for an industrial process. In addition, sulphuric acid is obtained as a by-product from different industrial processes and it is thus a reasonably cheap mineral acid. During the development of the method, it was observed that the extraction efficiency of sulphuric acid increases if nitric acid is added. The mixture in question was observed to be extremely effective and a large amount of rare earth elements were dissolved. In other words, washed ash that has not dissolved in the previous stage is extracted in the second stage using a mixture of sulphuric acid and nitric acid. The extraction typically lasts for a period of hours to tens of hours, depending on the properties and concentration of the solution. The extraction solution 30 containing sulphuric acid and nitric acid obtained from the second extraction process 11 is then led to a second step 16, which will be depicted in greater detail later, in order to isolate rare earth elements.

The solutions created in the extraction processes 10 and 11 are thus precipitated in two steps. In the first step 13 noble metals are precipitated, and in the second step 16 rare earth elements are precipitated. The extraction processes and the steps may be separate, but the extraction processes and steps are preferably linked to each other and arranged to operate seamlessly. Thus, the total process and equipment are compact. At the same time, the substances used in the processes may be recycled, and the yield of elements is maximized. In addition, energy consumption is reduced, as heat recovery may be utilized in the equipment.

Undissolved ash 17 remains after the two consecutive extraction processes. The undissolved ash 17, however, is mainly a residue 18 containing silicate. The residue 18 may include small amounts of elements, which if required may be isolated using one or more additional extraction processes (not shown). However, after the two extraction processes a significant proportion of the elements originally found in the ash have already been isolated. At the same time, harmful substances are also removed, in which case the silicate-containing residue can be exploited more extensively than before, without being given waste status. The undissolved residue contains mainly silicates and can be exploited, for example, in earthworks, such as in the bottom layers of roads as well as in cement manufacture.

As shown in FIG. 1, the ash 14 and 17 that is not dissolved in the extraction processes 10 and 11 is washed with water in washing stages 19 and 20, before the next treatment. In other words, the extract is separated from the undissolved ash, which is washed with water. The dissolved elements and the extraction solution are thereby recovered. At the same time, residues of the extraction solution, which could be detrimental to the following process or the exploitation of the residue, do not remain in the insoluble ash. In addition, the wash solution formed in the washing stages is returned to the extraction process 10 or 11 after the washing stage 19 and 20. Thus, even the wash water and the elements it contains are brought into the steps, in this example steps 13 and 16. In the washing stages, possible impurities are also removed, which are led to further treatment along with the insoluble residue.

Figure 2A:
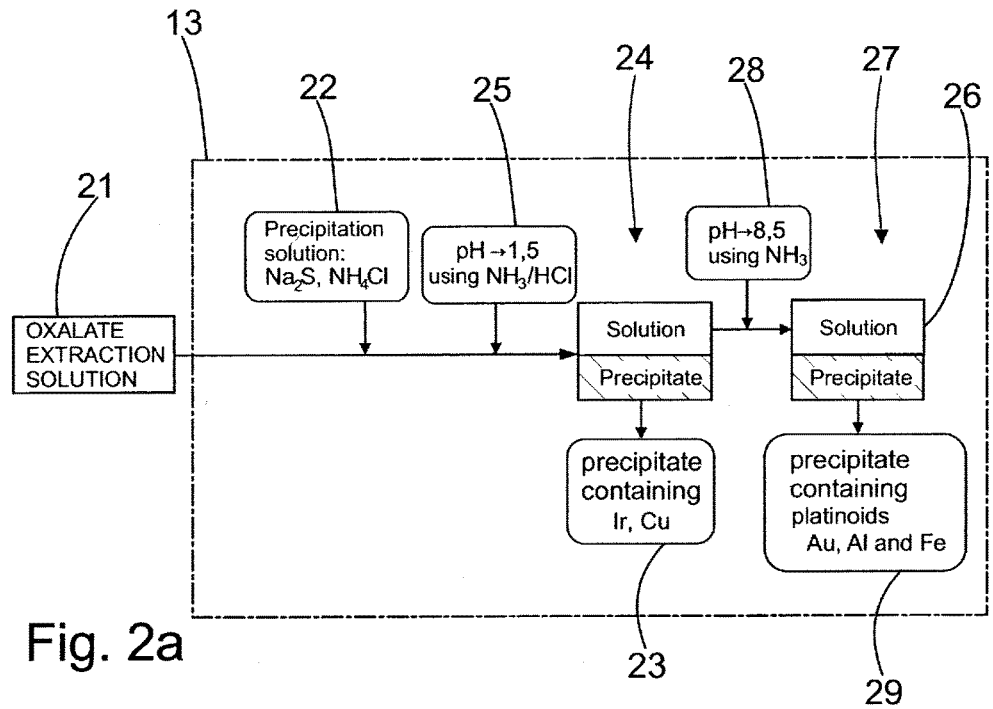
FIG. 2a is a schematic view of a first partial stage of the method according to the invention.

FIG. 2a schematically illustrates the first step 13 of the method according to the invention. In the first step 13, the oxalate solution 21 obtained from the first extraction process is processed in at least two stages. First, in a precipitation process 24, sulphide and a first precipitation solution 22 containing ammonium chloride are added to the oxalate solution 21 in order to separate iridium and copper. Sodium sulphide ($Na_2S$) or some other chemical with a sulphide content, as well as ammonium chloride ($NH_4Cl$), are used as the first precipitation solution 22. The noble metals are precipitated mainly as sulphides, and sodium sulphide is one of the cheapest sulphide-containing reagents. During the development of the method, it was observed that the addition of ammonium and chloride ions improved the precipitation of gold from the extraction solution. The contents of sodium sulphide ($Na_2S$) and ammonium chloride in the solution used for precipitation should be $0.6\pm0.1$ mol/l and $2.5\pm0.2$ mol/l, respectively. The solution is heated and allowed to cool, and a precipitate 23 is thereby formed. In this first precipitation process 24, the pH of the oxalate solution 21 is adjusted to 1.5 using an adjusting solution 25, such that the aforementioned elements are isolated precisely. The adjusting solution 25 is preferably hydrochloric acid (HCl) or $NH_3$. The pH of the solution 26 remaining from the first precipitation process 24 is adjusted in the second precipitation process 27 in order to precipitate the remaining noble metals. In this second precipitation process 27, the pH of the solution 26 is adjusted to 8.5, such that the remaining valuable elements will be precipitated. In this case too, the adjusting solution 28 is $NH_3$. After the pH has been raised, the solution is heated then allowed to cool and the precipitate is isolated. The precipitate 29 contains gold and platinum metals, and additionally iron and aluminium. The solution separated from the precipitate contains rubidium and magnesium. The various noble metals obtained from the precipitates 23 and 29 from the precipitation processes 24 and 27 are separated using some known technique. One possible way is to dissolve the precipitate using mineral acids, after which the noble metals can be isolated electrolytically.

Figure 2B:
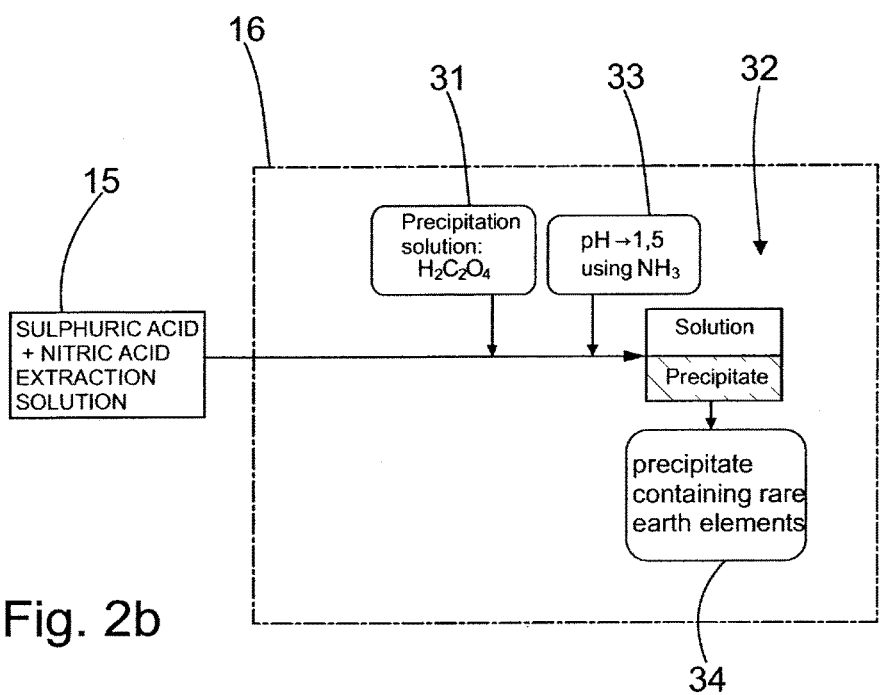
FIG. 2b is a schematic view of a second partial stage of the method according to the invention.

FIG. 2b schematically illustrates the second step 16 of the method according to the invention. The second step 16 includes a third precipitation process 32 in which an oxalic acid solution 31 is added to the extraction solution 30 obtained from the second extraction process 11 in order to separate rare earth elements. Surprisingly, the oxalic acid treatment in this case precipitates the rare earth elements. Oxalic acid is used because, according to the chemical properties of rare earth elements, they precipitate from an acid solution as oxalates.

In addition, in this third precipitation process 32 the pH of the extraction solution 30 is adjusted to $1.5\pm0.3$ using an adjusting solution 33. Thus, the most efficient precipitation is achieved. If the pH is raised any higher, other metals contained in the extraction solution will begin to accumulate as impurities in the precipitate. After the addition of oxalic acid and the adjustment of the pH, the solution is heated and allowed to cool, and a precipitate is formed. The formed precipitate is separated from the solution. The precipitate, which contains rare earth elements mainly as oxalates, is washed with water and the wash water is combined with the previously separated solution. The various rare earth elements obtained from the third extraction process 32 are separated using some known technique. The precipitate can be heated, for example at a temperature of 800 degrees, whereby oxides of the rare earth elements are formed. The exploitable product will then be a mineral concentrate containing oxides of rare earth elements.

The various stages of the separation process, and the extraction and precipitation substances and additives together with their contents, are described above. The extraction processes 10, 11 and/or the precipitation processes 24, 27, 32 are boosted by adjusting the temperature, adjusting the pressure, agitating the solution, treating the solution mechanically, and/or directing ultrasound to the solution. Particularly, a sufficiently high temperature and agitation combined with ultrasound will especially promote and accelerate the extraction processes. In tests, the elements were made to dissolve almost completely by using ultrasound.

In the separation process, noble metals and rare earth elements are recovered from ash. In addition, in the second stage 27 of the precipitation process the pH is adjusted by using ammonia and after the second stage 27 the solution is treated in such a way that the remaining nitrogen can be used as a fertilizer. This allows the nitrogen to be exploited. A second example of a preferred total process is the recycling of oxalate. According to the invention, the oxalic acid used in the rare earth elements precipitation process 32 is recycled to the first extraction process 10. This reduces material costs and permits the creation of a continuous process.

Thus, according to the invention, ash and particularly fly ash, is subjected to extraction in two stages. The extract arising in the first extraction process contains metals such as copper and especially noble metals. Noble metals are ruthenium, rhodium, palladium, silver, osmium, iridium, platinum, and gold. Of these, ruthenium, rhodium, palladium, osmium, iridium, and platinum are considered to be platinum-group metals. The extract arising in the second extraction process contains rare earth elements. Rare earth elements are scandium, yttrium, lanthanum, cerium, praseodymium, neodymium, promethium, samarium, europium, gadolinium, terbium, dysprosium, holmium, erbium, thulium, ytterbium, and lutetium. The elements in question are precipitated from both extracts in separate steps.

The method according to the invention provides for the processing of ash, particularly fly ash, arising from the combustion of solid fuels in energy production. In the process, valuable noble metals and rare earth elements are effectively isolated. In the isolation steps, extraction and precipitation processes are used, which are linked to each other to form a continuously operating method. The method is preferably a continuously operating process, in which the ash is treated to form a solid concentrate containing desired and valuable elements. Most of the ash is processed into an exploitable form via the method, and at the same time economically valuable elements are recovered.

The extract of the first extraction process, containing valuable elements, is processed on the batch principle in several consecutive stages, in order to bring the elements into a solid form. A solution of the correct strength containing sodium sulphide or other sulphides is added in a controlled manner to the solution of the first extraction process in order to precipitate iridium and copper. Subsequently, the pH of the remaining solution is raised using a solution of ammonia in water in order to precipitate noble metals. Oxalic acid of the correct concentration is added in a controlled manner to the mixture in the second extraction process, in order to bring rare earth elements into a solid form. In each precipitation stage, the solution being treated is allowed to react with the reagent for a sufficiently long period of time so that the maximum yield may be obtained. The desired elements remain as ions in the extraction solution along with the other soluble elements. The precipitates of the precipitation stages may contain undesirable elements, which are separated from the desired elements in actual metallurgical processes. In the method according to the invention, the extraction processes are optimized separately, so that the noble metals and rare earth elements are in their own extraction solutions. In other words, the extraction solutions are separated into solution fractions, in which the elements are concentrated evenly. Thus, the extraction processes have been advantageously kept in two extraction processes. In addition, the contents of undesirable elements in the formed solid precipitate are minimal. In the two-stage extraction process, two concentrates are formed, a noble metal concentrate and a rare earth element concentrate, which are processed separately.

A great deal of need exists for the method according to the invention, as the use of biomasses and waste in energy production is increasing greatly. Ash formed in the combustion of coal also may be processed using the method, though higher concentrations of desired elements are in biomasses such as tree stumps. However, coal ash contains a significant amount of palladium, gold, and iridium. When trees and other plants grow, they absorb minerals and elements from the ground along with water. These minerals and elements are concentrated in the structures of the trees and plants during growth. The benefit obtained from the present method includes the recovery of valuable elements. At the same time, the load on the environment is significantly reduced. By exploiting ash, blasting and other mining operations are avoided. In addition, the reagents used in the extraction of ash are considerably more environmentally friendly than the reagents used in the extraction of mineral substances. At the same time, the amount of ash finally disposed of is reduced.

In addition to noble metals, rare earth elements are also isolated using the present method. Rare earth elements appear in very small concentrations in groundwater, and hence they accumulate in, for example, trees. Research has surprisingly shown that tree stumps in particular contain high concentrations of rare earth elements. Peat also contains rare earth elements. The concentrations of rare earth elements in peat depend on the geology of the area. The discovery of noble metals greatly increases the value of the concentrate that can be obtained, as the price level of noble metals has remained nearly unchanged at a high level.

In tests, the total yield percentages vary in the range of 80-90% according to the quality of the ash in terms of desired elements. Two-stage extraction has proven advantageous, as in the first extraction process most of the noble metals as well as rubidium and gallium dissolve in a 0.75 M ammonium oxalate solution. When testing the extraction process, a good yield was obtained by using heating and ultrasound. In addition, standing the solution between short ultrasound treatments increased the yield. In the second extraction stage, the rare earth elements and some of the noble metals dissolved in a mixture of sulphuric and nitric acid, in which the sulphuric acid content was 0.3-1.0 mol/l and the nitric acid content was 0.05-0.25 mol/l. The following is one optimized example of the extraction processes: 10 ml 0.75 M ($(NH_4)_2C_2O_4$) was added to 500 mg ash and the solution was treated using ultrasound. The extract was then separated and the residue was transferred to a second extraction process, in which 10 ml 0.45 M $H_2SO_4$+5 ml 0.2 M $HNO_3$ was added. The solution was treated with ultrasound and the extract filtered. The residue remaining from the extraction processes contained mainly undissolved silicates. The extraction processes were strong, so that the solubility of the residue was very low. Thus, the residue can be utilized in, for example, earthworks or concrete manufacture.

The rare earth elements may be precipitated from the extraction solution for example as follows: 1 ml oxalic acid is added to the 20 ml of extraction solution of the second extraction process and the pH is adjusted to a value of 1.5 using $NH_3$, under constant agitation. The solution is heated in a 65° C. water bath for 40 minutes. The solution is centrifuged and the solution phase is separated and diluted with water. The precipitate is allowed to dry, after which the precipitate is dissolved with the aid of ultrasound in 2 ml aqua regia and diluted with water to a volume of 10 ml. The element concentrations are measured using, for example, an inductively coupled plasma optical emission spectrometer (ICP-OES). Using oxalic acid precipitation, about 80% of the rare earth elements are precipitated. The best amount of oxalic acid is about ten times the mass of rare earth elements. The consumption of oxalic acid is mainly affected by the elemental composition of the ash. The processing of the fly ash analyzed in the tests consumed about a kilogram of oxalic acid to each tonne of ash. The adjustment of the pH would correspondingly consume about 2500 liters of ammonia 5 mol/l water solution. The consumption of other reagents would be about 2500 liters of 0.06 M $Na_2S$ solution, about 2500 liters of 2.5 M ammonium chloride solution, and about 2500 liters of sulphuric acid.

Fly ash also may be processed as follows. A 200 ml 0.5 mol/l oxalic acid solution is added to a 10 gram ash sample. The ash sample is agitated mechanically for 2 hours. Heating and ultrasound are used during agitation to increase the dissolving of the elements. After the first extraction stage, the ash is separated from the solution, for example, by sedimentation. Subsequently, the noble metals are precipitated from the solution as sulphides. A 300 ml 0.5 mol/l sulphuric acid solution is added to the residual ash and the mixture is agitated for 1 hour. A stronger sulphuric acid solution may be used in extraction if the solution volume is reduced. The reduction of the solution volume also reduces the volume of the entire process, thus also reducing the process costs. In this case too, the use of heating and ultrasound increases the solubility of the elements. After the second extraction stage, the residual ash contains mostly silicates. In addition, rare earth elements are precipitated as oxalates from the sulphuric acid solution.

The noble metals are precipitated from the oxalate solution by adding 10 ml of a 0.66-0.6 mol/l $Na_2S$ water solution and raising the pH to a value of 1.2 by means of an alkali, for example a water solution of ammonia. Agitation and heating of the solution after the raising of the pH improves precipitation. The precipitate formed may be separated, for example, by sedimentation. The pH of the solution is further raised to a value of 8.5 by means of an alkali and the precipitate formed is separated from the solution.

The rare earth elements are precipitated from the sulphuric acid solution by adding an amount of oxalic acid that is 5-20 times greater than that of the amount of rare earth elements. The pH of the solution is raised to a value of 1.2 by means of an alkali, for example a water solution of ammonia, and the solution is agitated at room temperature for 20 minutes. The precipitate may be separated from the solution, for example by sedimentation. The above examples of processes can be scaled up to production plant dimensions. Thus, the processes described also function in production conditions, in which there are tonnes, or even tens of tonnes, of ash in each batch to be processed.

On the basis of the extraction tests, the ashes contain, for example, an average of 66.7 g/tn of rubidium, the market value of which corresponds to about €840 per tonne of ash, calculated according to the latest market prices of metals. Nowadays, the demand for rare earth elements has increased considerably. The so-called light lanthanides, including cerium, praseodymium, neodymium, and lanthanum are regarded as the most significant in terms of demand. Their total average content in ashes are about 250 g/tn. By means of the present method, palladium, significant amounts of iridium, gold, rubidium, and platinum are also recovered, up to 2.7, 17.8, 4.2, 83.4, and 2.7 g/tn, respectively. The value of even these five elements is nearly €3000 per tonne.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

The invention claimed is:

1. Method for processing ash, in which method several elements are separated from the ash, characterized in that the several elements include both noble metals and rare earth elements, the noble metals and the rare earth elements are separated from the ash in two extraction processes, wherein the noble metals are separated in the first extraction process and the rare earth elements are separated in the second extraction process, and solutions obtained in the extraction processes are precipitated in two steps, in the first step of which noble metals are precipitated and in the second step of which rare earth elements are precipitated.

2. Method according to claim 1, characterized in that the extraction processes and the precipitation steps are linked to each other.

3. Method according to claim 1, characterized in that in the first extraction process noble metals are dissolved using a water solution having an oxalate content.

4. Method according to claim 1, characterized in that in the second extraction process rare earth elements are dissolved out of undissolved ash from the first extraction process, with a mixture of sulphuric acid and nitric acid.

5. Method according to claim 1, characterized in that an oxalate-extraction solution obtained from the first extraction process is processed in at least two stages, in such a way that in a first precipitation stage a first precipitation solution containing sulphide and ammonium chloride is added to the oxalate-extraction solution, in order to separate iridium and copper, and in a second precipitation stage the pH of the oxalate-extraction solution remaining from the first stage is raised in order to precipitate the rest of the noble metals.

6. Method according to claim 5, characterized in that in the first precipitation stage the pH of the oxalate-extraction solution is 1.5±0.3 and in the second precipitation stage the pH of the solution is 8.5±0.3.

7. Method according to claim 1, characterized in that an oxalic acid solution is added to an extraction solution obtained from the second extraction process, in order to separate rare earth elements as a third precipitation stage.

8. Method according to claim 7, characterized in that in the third precipitation stage the pH of the extraction solution is 1.5±0.3.

9. Method according to claim 7, characterized in that an oxalic acid solution is added to the third precipitation stage.

10. Method according to claim 1, characterized in that ash undissolved in the extraction processes is washed with water in wash stages before following treatment of the undissolved ash.

11. Method according to claim 10, characterized in that the wash solution formed in the wash stages is returned to the extraction processes after the wash stages.

12. Method according to claim 1, characterized in that the extraction processes are boosted by one or more of adjusting the temperature of the solutions, adjusting the pressure of the solutions, agitating the solutions, treating the solutions mechanically, and directing ultrasound to the solutions.

13. Method according to claim 6, characterized in that in the second precipitation stage the pH is adjusted with ammonia and after the nitrogen remaining after the second precipitation stage is collected as fertilizer.

14. Method according to claim 7, characterized in that the oxalic acid used in the third precipitation stage is recycled to the first extraction process.

* * * * *